United States Patent Office 3,694,218
Patented Sept. 26, 1972

3,694,218
METHOD OF HOLOGRAM RECORDING
John D. Margerum, Woodland Hills, and Alexander D. Jacobson, Los Angeles, Calif., assignors to Hughes Aircraft Company, Culver City, Calif.
No Drawing. Filed Mar. 3, 1970, Ser. No. 16,210
Int. Cl. G03c 5/00
U.S. Cl. 96—35.1       4 Claims

ABSTRACT OF THE DISCLOSURE

Method of holographic photopolymer recording by an optical system of the interference pattern between wavefronts emanating from an object illuminated with laser radiation and a coherent reference wavefront.

CROSS-REFERENCES TO RELATED APPLICATIONS

John B. Rust, Ser. No. 824,902 (abandoned), John B. Rust, Ser. No. 824,903 (abandoned), John B. Rust, Ser. No. 583,649 (Pat. No. 3,531,281), Leroy J. Miller et al., Ser. No. 583,650 (Pat. No. 3,531,282), John D. Margerum, Ser. No. 583,651 (Pat. No. 3,556,794), John B. Rust et al., Ser. No. 583,652 (Pat. No. 3,598,584), John D. Margerum, Ser. No. 616,461 (Pat. No. 3,549,-366), John B. Rust, Ser. No. 616,599 (Pat. No. 3,556,-790), John B. Rust, Ser. No. 616,587 (allowed), John B. Rust, Ser. No. 714,532 (Pat. No. 3,595,664), John B. Rust, Ser. No. 714,596, John B. Rust, Ser. No. 884,-716 (Pat. No. 3,642,487).

BACKGROUND OF THE INVENTION (1) Field of the invention

The invention or improvement provided herein is production and storage of image information by holographic photopolymerization of ethylenically polymerizable systems utilizing an initiator system of photo-oxidant and catalyst system inactive in the dark and activated by laser beams in forming the hologram in photopolymers. A hologram is a recording of the interference pattern between wavefronts emanating from an object illuminated with coherent radiation and a coherent reference wavefront. The method herein produces and records holographic images in photopolymerization systems. The recordings have a resolution on the order of up to 3000 lines/mm. and of reduced signal to noise ratio particularly up to a resolving power of 1000 to 1500 lines/mm. These are available in a few seconds or less for read-out.

The preferred photopolymerizable composition contains mixtures of ethylenic unsaturated compounds in combination with an organic photo-oxidant inactive in the absence of light but being capable of being raised to a polymerization initiating level by laser beam radiation in combination with a catalyst material as an organic sulfinic compound or derivative, a triorgano phosphine or triorgano arsine, or mixtures of catalyst capable of releasing an electron at said level to produce free radicals capable of effecting polymerization of said unsaturated compounds. The exemplary mixtures of unsaturated ethylene materials and catalyst combinations are more fully described in the above enumerated references, including the applicable operable methods of presensitizing and fixing which are incorporated herein by reference.

(2) Description of the prior art

The present art consists of the use of special high resolution silver halide emulsions as recording media which are developed chemically after holographic exposures.

SUMMARY OF THE INVENTION

The method of hologram recording by utilizing a photosensitive material based on photo-induced polymerization to record holograms on photopolymers and processing by optical means to permit rapid access to the reconstructed image, and the product produced therewith.

DESCRIPTION OF THE PREFERRED EMBODIMENTS

Example 1.—The material used for holographic imaging was prepared by mixing the following monomer and photocatalyst solutions in the volume ratio of 5:1:
Monomer solution:

1.6 M barium acrylate
0.5 M lead acrylate
3.3 M acrylamide

Photocatalyst solution:

0.002 M methylene blue
0.1 M p-toluenesulfinic acid sodium salt
0.1 M 4-nitrophenylacetic acid sodium salt For making hologram exposures, two 5-cm.-square glass cover slides were used to form a thin cell, providing a photopolymer layer 10–20$\mu$ thick. Two-beam transmission holograms were made with angles of 4 and 30 deg. between the subject and reference beams. The light source was a mode-controlled, normal pulse, ruby laser. Both collimated and diffuse illumination were used to make transmission holograms of a transparent resolution chart. Diffuse illumination was obtained by inserting a ground glass screen about 5 cm. from the subject on the illuminated side. Exposure levels were in the range 1 to 30 mj./cm.$^2$, with some "presensitization" exposure to a weak tungsten lamp. This presensitization exposure partially overcomes the induction phase preceding polymerization, during which a small concentration of polymerization inhibitors is eliminated. This presensitization exposure does not produce an appreciable "fog" level in the material. The optical fixing proceudre consisted of a 15- to 30-sec. exposure to a 200 w. mercury arc lamp (with no condensing lenses), with water and CS 7–54 Corning glass filters. The processed holograms are quite stable and seem to last indefinitely.

Example 2.—The hologram pattern consisted of interference fringes formed in a conventional two beam hologram system using a resolution chart transparency as a subject and a pulsed ruby laser as the light source. The photopolymerizable media was contained between two 8 cm. x 10 cm. glass slides with a 0.017 cm. tape spacer and was placed approximately 1 meter from the subject transparency in one of the two collimated laser beams that were used to form the hologram. The material consisted of a mixture of 4.0 ml. of an aqueous lead, barium acrylate solution (D1298–63A) at pH 6.7 mixed with 0.5 ml. of a photocatalyst solution (D1298–63B) containing methylene blue, sodium p-toluenesulfinate, and sodium 4-nitrophenylacetate in a glycerol solution. The sample was presensitized with a low intensity tungsten lamp for 30 sec. After an exposure of approximately 6 mj. from the ruby laser the sample was temporarily fixed by flooding it for 2 sec. with the output from a PEK 200 w. compact Hg arc filtered with a CS 7–54 filter. Examinations of the recorded pattern with an argon-ion laser and with a microscope showed that well defined, high contrast fringes were formed on the photopolymer. Further evidence of successful hologram recording was found on examination of the clearly defined reconstructed real image produced by playing the photopolymer hologram back with a HeNe gas laser.

Example 3.—The same conditions and composition as in Example 2, except that an extended period of full arc exposure (about 3 min.) from the 200 w. Hg lamp was used to completely polymerize the sample and to "reverse" the image. Examination of this pattern showed well-defined fringes when the hologram was examined under a microscope.

Additional examples, illustrative of the preparation of monomer solutions and photocatalyst solutions are provided as follows:

TABLE I

Monomer solutions

| Solution number | Concentration (solvent is water) | pH |
|---|---|---|
| E2724-2A | 3.6 M Ba acrylate, 0.9 M Pb acrylate plus 30 g. acrylamide per 100 cm.³. | 6.3 |
| E2724-10A | Same as E2724-2A | 6.3 |
| E2724-2C | 2.8 M Ba acrylate, 0.7 M Pb acrylate plus 30 g. acrylamide per 100 cm.³. | 8.0 |
| E2724-2D | 4.0 M Ba acrylate plus 30 g. acrylamide per 100 cm.³. | 8.0 |
| E2724-2E | Same as E2724-2C | 6.3 |
| E2724-13A | 6.85 M Ba acrylate | 7.0 |
| E2724-13B | 5.48 M Ba acrylate, 1.37 M Pb acrylate | 7.0 |
| E2724-13C | 6.85 M acrylamide plus 6 g. methylenebis-acrylamide per 100 cm.³. | 7.0 |
| E2724-46A | 1.8 M Ba acrylate, 1.75 M acrylamide, 0.085 M methylenebisacrylamide plus 2.9 g. gelatin per 100 cm.³ and 5 drops Triton X-100 wetting agent per 100 cm.³. | (¹) |
| 1365-92 | Ba-Pb acrylate of unknown molarity plus 30 g. of acrylamide per 100 cm.³. | 8.0 |

¹ Ba acrylate pH adjusted to 7.0 before adding rest of materials.

Catalyst solutions are preparations of the following:

TABLE II

Photocatalyst solutions

| Solution number | Solution |
|---|---|
| E2724-1B | 0.1 M p-toluenesulfinic acid; 0.1 M 4-nitrophenylacetic acid; 2.2×10⁻³ M methylene blue; solvent: glycerol. |
| E2724-42 | 0.1 M p-toluenesulfinic acid; 6×10⁻³ methylene blue; solvent: water. |

Various monomer mixtures were prepared in combination with the different photocatalyst solutions in the proportion of 5 parts monomer solution to 1 part catalyst solution selected as a suitable operable composition. This proportion of solution ratio, including each solution composition may vary somewhat, with care being taken to use sufficient of the polymerizable material and not to use too little of the dye or too much of the dye. An insufficient amount will not effect laser polymerization and too great an amount, or excess, may reduce efficiency and results.

As heretofore described, the composition mixtures are formed as a thin film between a pair of 2 inch square glass cover slides. Otherwise, the photopolymerizable mixture may be applied to a suitable backing in combination with suitable thickening agents as gelatin, resinous, cellulosic material, and the like transparent material, or such materials may serve as the base coating on a suitable support.

The optical system used to photopolymerize and record laser beam holograms was a conventional two beam recording structure. The first laser source employed was a ruby laser. Successful holograms were recorded of transparencies with the pulsed ruby laser and with a helium neon laser. The collimated beams of the recording structure were regulated to coincide through a transparency and on the film plane in any angle of intersection between 4°–180°, and with equal path lengths from the beam source. Holograms of interference patterns were recorded by photopolymerization with spatial frequencies from 110 to 3000 lines/mm. in the prepared samples utilizing 6328 A. and 6943 A. laser beam source. The holograms were read out instantaneously as the exposure was being recorded. In this sense these holograms are available in real time.

The diffraction efficiencies of these photopolymer holograms are much higher than 3%, illustrating that there is also phase recording in the materials. In general the measured values were all considerably higher than the calculated efficiencies, as illustrated by the following table.

TABLE III

Calculted Diffraction Efficiencies Assuming Pure Amplitude Recording in E2724-2A plus E2724-1B, Compared with Observed Values

| Exposure conditions | | Calculated diffraction efficiencies, percent | Measured diffraction efficiencies, percent |
|---|---|---|---|
| $E_{max.}$, mj./cm.² | $E_{min.}$, mj./cm.² | | |
| 11.3 | 0.23 | 2.9 | 4.8 |
| 5.65 | 0.125 | 0.62 | 6.0 |
| 3.53 | 0.072 | 0.022 | 3.8 |

Having described and illustrated the present embodiment of this invention, improvement and/or discovery in the art in accordance with the patent statutes, it will be apparent that some modifications and variations including mixtures of the embodied components, as claimed, may be made without departing from the spirit and scope thereof. The specific embodiments described are given by way of examples illustrative of the changes and improvement discovered applicable herein and which are to be construed or limited only by the terms of the appended claims.

What is claimed is:

1. A method of hologram recording by photopolymerization of a photosensitive composition comprising:
    (A) providing a mixture of
        (1) a photopolymerizable ethylenically unsaturated compound selected from the group consisting of metal acrylates, acrylamide, bisarylamide, and mixtures of the same containing relatively smaller amounts of
        (2) an organic photo-oxidant consisting of a dye material and catalyst selected from the group consisting of an organic sulfinic compound, a triorgano phosphine, triorgano arsine, or mixture of said catalyst providing a combination inactive in the absence of light but the combination being active in the presence of laser beam irradiation to produce free radicals capable of initiating polymerization of said unsaturated compound,
    (B) irradiating said mixture in the light of collimated holographic laser beams, and
    (C) recording a holographic photopolymer imaging of said beams in the different wavefronts emanating from said holographic beams.

2. The product produced by the method of claim 1.

3. The method of claim 1 in which the holographically stored image is played back substantially as the exposure is made by additional exposure to viewing light.

4. The method of claim 1, including the use of diffused light in the subject beam or in the reference beam or in both beams and to record the image in photopolymer hologram.

References Cited

UNITED STATES PATENTS

| 3,526,505 | 9/1970 | Kroemer | 96—27 H |
| 3,531,281 | 9/1970 | Rust | 96—115 P |
| 3,531,282 | 9/1970 | Miller et al. | 96—115 P |
| 3,547,509 | 12/1970 | Brandes | 96—27 H |

NORMAN G. TORCHIN, Primary Examiner

E. C. KIMLIN, Assistant Examiner

U.S. Cl. X.R.

96—27 H